US012679084B2

(12) United States Patent
Matsubayashi et al.

(10) Patent No.: US 12,679,084 B2
(45) Date of Patent: Jul. 14, 2026

(54) DRIVE METHOD OF LIQUID DISCHARGE APPARATUS

(71) Applicant: SEIKO EPSON CORPORATION, Tokyo (JP)

(72) Inventors: Tomohiro Matsubayashi, Matsumoto (JP); Ken Yamagishi, Shiojiri (JP); Toshiyuki Yamagata, Shiojiri (JP); Kento Nawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 143 days.

(21) Appl. No.: 18/407,519

(22) Filed: Jan. 9, 2024

(65) Prior Publication Data

US 2024/0227389 A1 Jul. 11, 2024

(30) Foreign Application Priority Data

Jan. 10, 2023 (JP) ................................ 2023-001524

(51) Int. Cl.
*B41J 2/045* (2006.01)

(52) U.S. Cl.
CPC ....... *B41J 2/04573* (2013.01); *B41J 2/04541* (2013.01); *B41J 2/04563* (2013.01); *B41J 2/04565* (2013.01); *B41J 2/04581* (2013.01)

(58) Field of Classification Search
CPC ......................... B41J 2/04573; B41J 2/04541; B41J 2/04563; B41J 2/04565; B41J 2/04581; B41J 2002/14362; B41J 2002/14419; B41J 2002/14491; B41J 2202/21; B41J 2/04508; B41J 2/04588; B41J 2/14233
See application file for complete search history.

(56) References Cited

U.S. PATENT DOCUMENTS

2005/0190232 A1* 9/2005 Lee ...................... B41J 2/14233 347/45
2022/0072856 A1* 3/2022 Yajima ................. B41J 2/14233
2022/0258472 A1 8/2022 Hirai et al.

FOREIGN PATENT DOCUMENTS

JP 2002-225238 A 8/2002
JP 4419412 B2 2/2010
JP 2022-124599 A 8/2022

* cited by examiner

*Primary Examiner* — Jannelle M Lebron

(74) *Attorney, Agent, or Firm* — Harness, Dickey & Pierce, P.L.C.

(57) ABSTRACT

There is provided a drive method of a liquid discharge apparatus including a liquid discharge head that includes a nozzle, a pressure chamber, a piezoelectric element, a drive line, and a resistor that is made of the same material as any of the first electrode, the second electrode, and the drive line. The method includes: executing a non-printing process of preventing a liquid from being discharged toward a recording medium after executing a first printing process of printing a first image on the recording medium and before executing a second printing process of printing a second image on the recording medium; and detecting a potential of the resistor when a state of a potential applied to the drive line is in a state of causing no liquid to be discharged from the nozzle during an execution period of the non-printing process.

9 Claims, 11 Drawing Sheets

DRIVE METHOD OF LIQUID DISCHARGE APPARATUS

The present application is based on, and claims priority from JP Application Serial Number 2023-001524, filed Jan. 10, 2023, the disclosure of which is hereby incorporated by reference herein in its entirety.

BACKGROUND

1. Technical Field

The present disclosure relates to a drive method of a liquid discharge apparatus.

2. Related Art

A liquid discharge apparatus typified by an ink jet printer generally includes a liquid discharge head that discharges a liquid such as ink.

For example, a liquid discharge head disclosed in JP-A-2022-124599 includes a nozzle that discharges a liquid, a pressure chamber communicating with the nozzle, a piezoelectric element that causes a pressure fluctuation in a liquid in the pressure chamber, and a resistance line for detecting a temperature of the pressure chamber. Here, the resistance line is made of the same material as an electrode of the piezoelectric element or a wiring coupled to the electrode.

In the related art, when a temperature of the liquid in the pressure chamber is detected by using the liquid discharge head disclosed in JP-A-2022-124599, there is a problem in that noise from a drive signal for driving the piezoelectric element is superimposed on a detection signal, resulting in a decrease in detection accuracy.

SUMMARY

According to an aspect of the present disclosure, there is provided a drive method of a liquid discharge apparatus including a liquid discharge head that includes a nozzle, a pressure chamber communicating with the nozzle, a piezoelectric element applying a pressure to a liquid in the pressure chamber, a drive line coupled to the piezoelectric element, and a resistor for measuring a temperature of the liquid in the pressure chamber, in which the piezoelectric element has a first electrode, a second electrode, a piezoelectric body disposed between the first electrode and the second electrode, and the resistor is made of the same material as any of the first electrode, the second electrode, and the drive line, the method including: executing a non-printing process of preventing a liquid from being discharged toward a recording medium after executing a first printing process of printing a first image on the recording medium by a liquid discharged from the nozzle and before executing a second printing process of printing a second image on the recording medium by a liquid discharged from the nozzle; and detecting a potential of the resistor when a state of a potential applied to the drive line is in a state of causing no liquid to be discharged from the nozzle during an execution period of the non-printing process.

DESCRIPTION OF EMBODIMENTS

Figure 1:
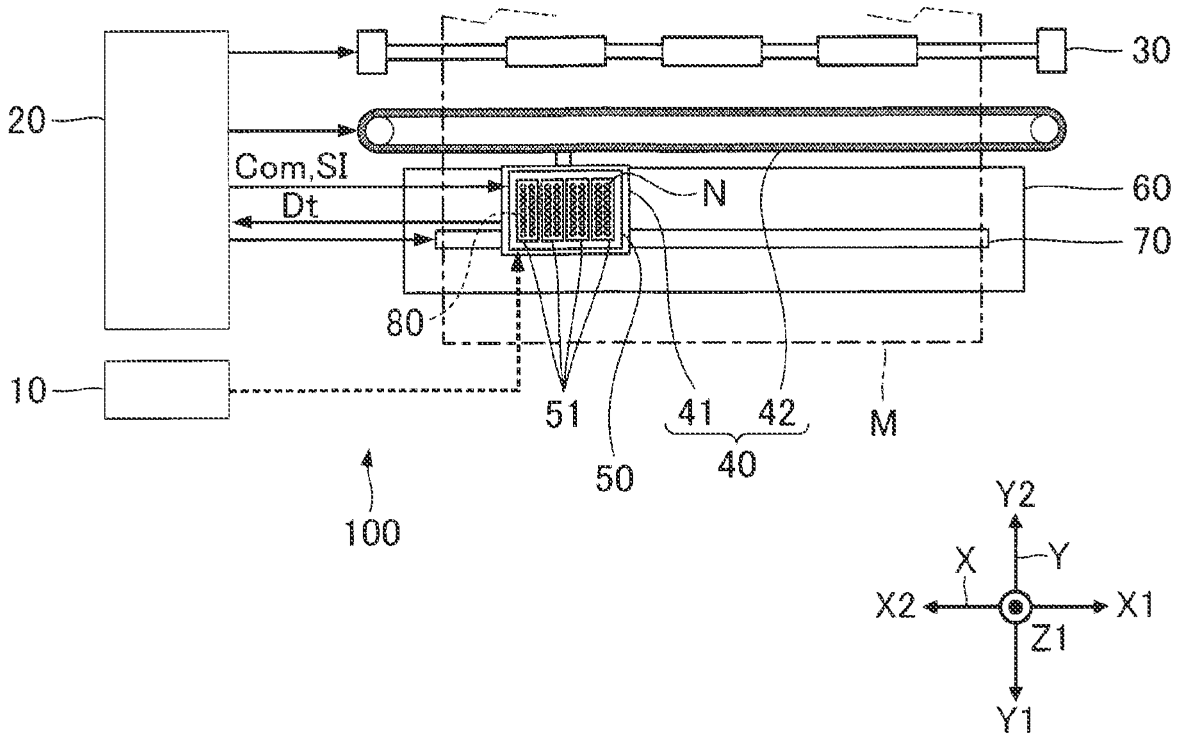
FIG. 1 is a schematic diagram illustrating a configuration example of a liquid discharge apparatus according to a first embodiment.

Hereinafter, preferred embodiments according to the present disclosure will be described with reference to the accompanying drawings. In the drawings, dimensions and scales of each portion are appropriately different from actual ones, and some portions are schematically illustrated to facilitate understanding. In addition, the scope of the present disclosure is not limited to the forms unless the present disclosure is particularly limited in the following description.

In the following description, for the sake of convenience of specifying a position, direction, or the like, an X axis, a Y axis, and a Z axis that intersect each other are appropriately used. In addition, hereinafter, one direction along the X axis is an X1 direction, and a direction opposite to the X1 direction is an X2 direction. Similarly, directions opposite to each other along the Y axis are a Y1 direction and a Y2 direction. In addition, directions opposite to each other along the Z axis are a Z1 direction and a Z2 direction.

Here, typically, the Z axis is a vertical axis, and the Z2 direction corresponds to a downward direction in a vertical direction. Note that the Z axis does not have to be the vertical axis. In addition, the X axis, the Y axis, and the Z axis are typically orthogonal to each other. However, without being limited to this, all of these need only intersect each other at an angle within a range of, for example, 80° or more and 100° or less.

A: First Embodiment

A1: Overall Configuration of Liquid Discharge Apparatus

FIG. 1 is a schematic diagram illustrating a configuration example of a liquid discharge apparatus 100 according to a first embodiment. The liquid discharge apparatus 100 is an ink jet printing apparatus that discharges ink, which is an example of a "liquid", onto a recording medium M as a liquid droplet. The recording medium M is, for example, printing paper. The recording medium M is not limited to the printing paper, and may be a printing target of any desired material such as a resin film or a cloth.

As illustrated in FIG. 1, the liquid discharge apparatus 100 has a liquid container 10, a control module 20, a transport mechanism 30, a movement mechanism 40, a liquid discharge head 50, a support section 60, and a heater 70.

The liquid container 10 stores an ink. Specific aspects of the liquid container 10 include, for example, a cartridge that can be attached to and detached from the liquid discharge apparatus 100, a bag-shaped ink pack made of a flexible film, and an ink tank that can be refilled with an ink. A type of the ink stored in the liquid container 10 is set in any desired way.

The control module 20 controls an operation of each element of the liquid discharge apparatus 100. Here, the control module 20 outputs a drive signal Com for driving the liquid discharge head 50 and a control signal SI for controlling the drive of the liquid discharge head 50. In addition, a detection signal Dt indicating a temperature of the liquid discharge head 50 is input to the control module 20. The control module 20 corrects the drive signal Com or adjusts a set temperature of the heater 70, based on the detection signal Dt. Details of the control module 20 will be described below with reference to FIG. 2.

The transport mechanism 30 transports the recording medium M along the Y axis under the control of the control module 20. In the example illustrated in FIG. 1, a transport direction of the recording medium M by the transport mechanism 30 is the Y1 direction.

The movement mechanism 40 reciprocates the liquid discharge head 50 along the X axis under the control of the control module 20. The movement mechanism 40 has a substantially box-shaped transport body 41 called a carriage that accommodates the liquid discharge head 50, and an endless transport belt 42 to which the transport body 41 is fixed. The number of the liquid discharge heads 50 mounted on the transport body 41 is not limited to one, and may be plural. In addition to the liquid discharge head 50, the above-described liquid container 10 may be mounted on the transport body 41.

Under the control of the control module 20, the liquid discharge head 50 discharges the ink supplied from the liquid container 10 onto the recording medium M from each of a plurality of nozzles. This discharge is performed in parallel with the transport of the recording medium M by the transport mechanism 30 and the reciprocating movement of the liquid discharge head 50 by the movement mechanism 40, thereby forming an image by an ink on a surface of the recording medium M.

In the example illustrated in FIG. 1, the liquid discharge head 50 includes a plurality of head chips 51. The head chip 51 has a plurality of nozzles N for discharging an ink. A configuration example of the head chip 51 will be described below with reference to FIGS. 3 to 7. The number of the head chips 51 included in the liquid discharge head 50 is not limited to the example illustrated in FIG. 1, and may be one or more and three or less, or five or more.

The support section 60 is a stand that supports the recording medium M in a state of receiving an impact of the ink discharged from the liquid discharge head 50, and is also called a platen. Such a support section 60 supports the recording medium M that faces the plurality of nozzles N of the liquid discharge head 50 during printing.

The heater 70 heats the support section 60 to a set temperature under the control of the control module 20. This heating can accelerate drying of the ink on the recording medium M. As a result, the ink on the recording medium M is retained at a desired position, so that an image quality can be improved.

A2: Electrical Configuration of Liquid Discharge Apparatus

Figure 2:
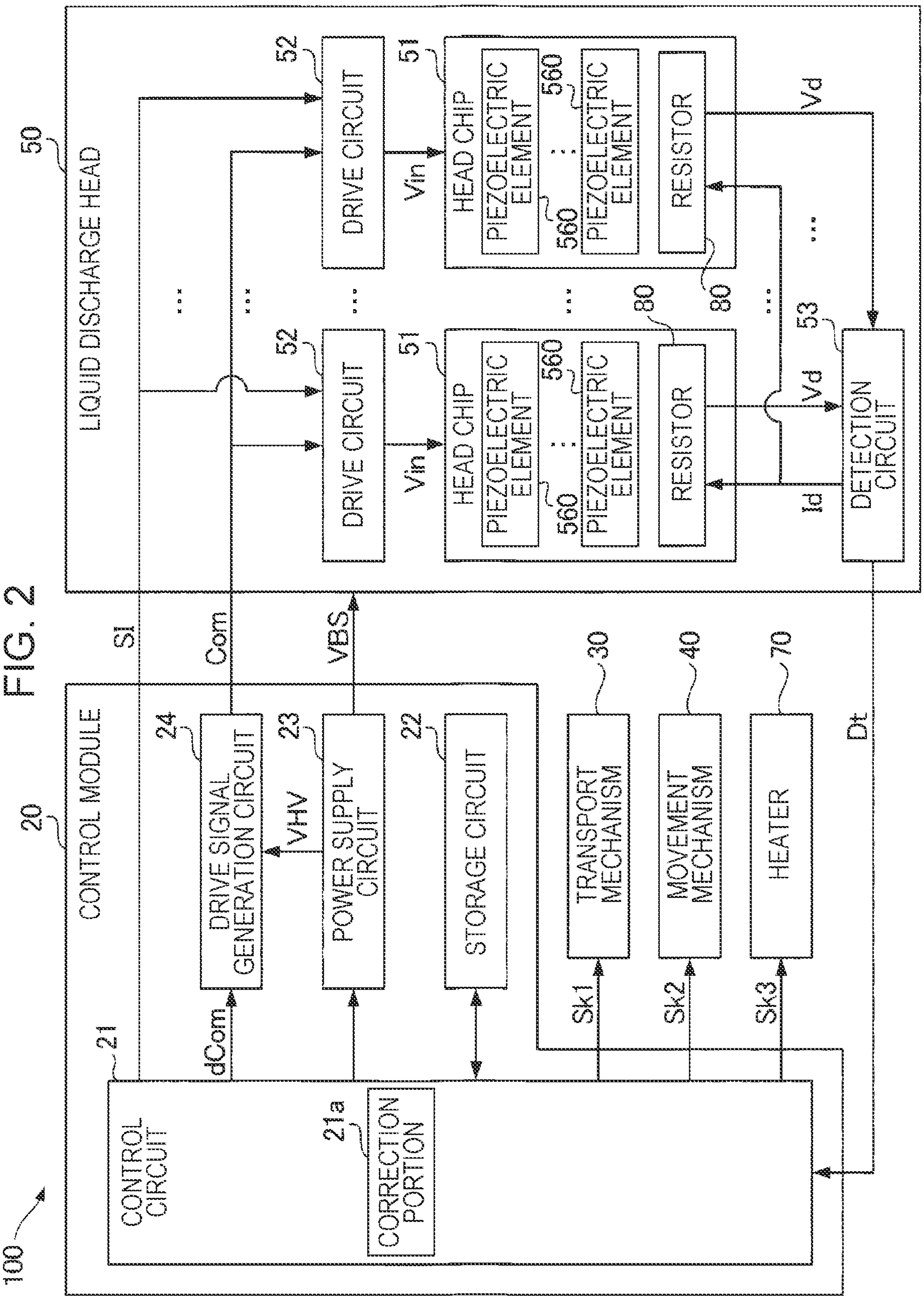
FIG. 2 is a block diagram illustrating an electrical configuration of the liquid discharge apparatus according to the first embodiment.

FIG. 2 is a block diagram illustrating an electrical configuration of the liquid discharge apparatus 100 according to the first embodiment. As illustrated in FIG. 2, the liquid discharge head 50 has the plurality of head chips 51, a plurality of drive circuits 52, and a detection circuit 53.

Each of the plurality of head chips 51 has a plurality of piezoelectric elements 560 and a resistor 80.

Each of the plurality of piezoelectric elements 560 included in the head chip 51 is driven by an inverse piezoelectric effect by receiving a supply of a supply drive signal Vin. The resistor 80 has a characteristic that a resistance value changes according to a change in temperature. Details of the head chip 51 will be described below with reference to FIGS. 3 to 7.

The drive circuit 52 is provided for each head chip 51 to correspond to the plurality of head chips 51, and drives the piezoelectric element 560 of the corresponding head chip 51 under the control of the control module 20. Specifically, under the control of the control module 20, the drive circuit 52 switches whether or not to supply the drive signal Com output from the control module 20 as the supply drive signal Vin to each of the plurality of piezoelectric elements 560 included in the head chip 51.

The detection circuit 53 is a circuit for detecting a temperature of each of the plurality of head chips 51. Specifically, the detection circuit 53 has a circuit that supplies a current Id to the resistor 80 of each head chip 51 and a circuit that detects a potential Vd corresponding to a voltage applied to the resistor 80 of each head chip 51, and outputs a detection signal Dt corresponding to the potential Vd.

The current Id is a predetermined constant current that flows between two predetermined positions such as both ends of the resistor 80. The potential Vd is a potential of the resistor 80 with a constant potential, such as an offset potential VBS, as a reference potential. The potential Vd changes according to a resistance value of the resistor 80. As described above, since the resistance value of the resistor 80 changes according to a change in temperature, the potential Vd changes according to a change in temperature. Therefore, the detection signal Dt corresponding to the potential Vd is a signal indicating the temperature of the head chip 51, more specifically, a temperature of an ink in a pressure chamber C (to be described below) of the head chip 51. The temperature indicated by the detection signal Dt may be a temperature of the ink in the pressure chamber C for each head chip 51, or may be a statistical value such as an average value, a median value, or a mode of the temperatures of the ink in the pressure chambers C of the plurality of head chips 51.

As illustrated in FIG. 2, the control module 20 has a control circuit 21, a storage circuit 22, a power supply circuit 23, and a drive signal generation circuit 24.

The control circuit 21 has a function of controlling an operation of each portion of the liquid discharge apparatus 100 and a function of processing various data.

The control circuit 21 includes, for example, one or more processors such as a central processing unit (CPU). The control circuit 21 may include a programmable logic device such as a field-programmable gate array (FPGA) instead of the CPU or in addition to the CPU. In addition, when the control circuit 21 is configured of a plurality of processors, for example, an operation control of the drive circuit 52 and an operation control of the detection circuit 53 may be performed by separate processors. In addition, when the control circuit 21 is configured of a plurality of processors, the plurality of processors may be mounted on different substrates or the like.

The storage circuit 22 stores various programs executed by the control circuit 21 and various data such as print data processed by the control circuit 21. The storage circuit 22 includes, for example, a semiconductor memory of one or both of a volatile memory such as a random access memory (RAM) and a non-volatile memory such as a read only memory (ROM), an electrically erasable programmable read-only memory (EEPROM) or a programmable ROM (PROM). The print data is supplied from an external device such as a personal computer or a digital camera. A part or an entirety of the storage circuit 22 may be configured as a part of the control circuit 21.

The power supply circuit 23 receives a supply of power from a commercial power supply (not illustrated), and generates various predetermined potentials. The generated various potentials are appropriately supplied to each portion of the liquid discharge apparatus 100. For example, the power supply circuit 23 generates a power supply potential VHV and an offset potential VBS. The offset potential VBS is supplied to the liquid discharge head 50. In addition, the power supply potential VHV is supplied to the drive signal generation circuit 24.

The drive signal generation circuit 24 is a circuit that generates the drive signal Com for driving each piezoelectric element 560. Specifically, the drive signal generation circuit 24 has, for example, a DA conversion circuit and an amplifier circuit. In the drive signal generation circuit 24, the DA conversion circuit converts, from a digital signal to an analog signal, a waveform designation signal dCom from the control circuit 21, and the amplifier circuit generates the drive signal Com by amplifying the analog signal using the power supply potential VHV from the power supply circuit 23. Here, among waveforms included in the drive signal Com, a signal of a waveform actually supplied to the piezoelectric element 560 is the above-described supply drive signal Vin. The waveform designation signal dCom is a digital signal for defining a waveform of the drive signal Com.

In the above control module 20, the control circuit 21 controls the operation of each portion of the liquid discharge apparatus 100 by executing the program stored in the storage circuit 22. Here, the control circuit 21 executes the program, thereby generating a control signal Sk1, a control signal Sk2, a control signal Sk3, a control signal SI, and the waveform designation signal dCom as a signal for controlling the operation of each portion of the liquid discharge apparatus 100.

The control signal Sk1 is a signal for controlling the drive of the transport mechanism 30. The control signal Sk2 is a signal for controlling the drive of the movement mechanism 40. The control signal Sk3 is a signal for controlling the drive of the heater 70. The control signal SI is a digital signal for designating an operating state of the piezoelectric element 560. The control signal SI may include a timing signal for defining a drive timing of the piezoelectric element 560. The timing signal is generated, for example, based on an output of an encoder that detects a position of the above-described transport body 41.

In addition, the control circuit 21 functions as a correction portion 21*a* by executing a program stored in the storage circuit 22.

The correction portion 21*a* adjusts one or both of the waveform designation signal dCom and the control signal Sk3 based on the detection signal Dt. Through this adjustment, the correction portion 21*a* corrects the drive signal Com or the set temperature of the heater 70.

A3: Head

Figure 3:
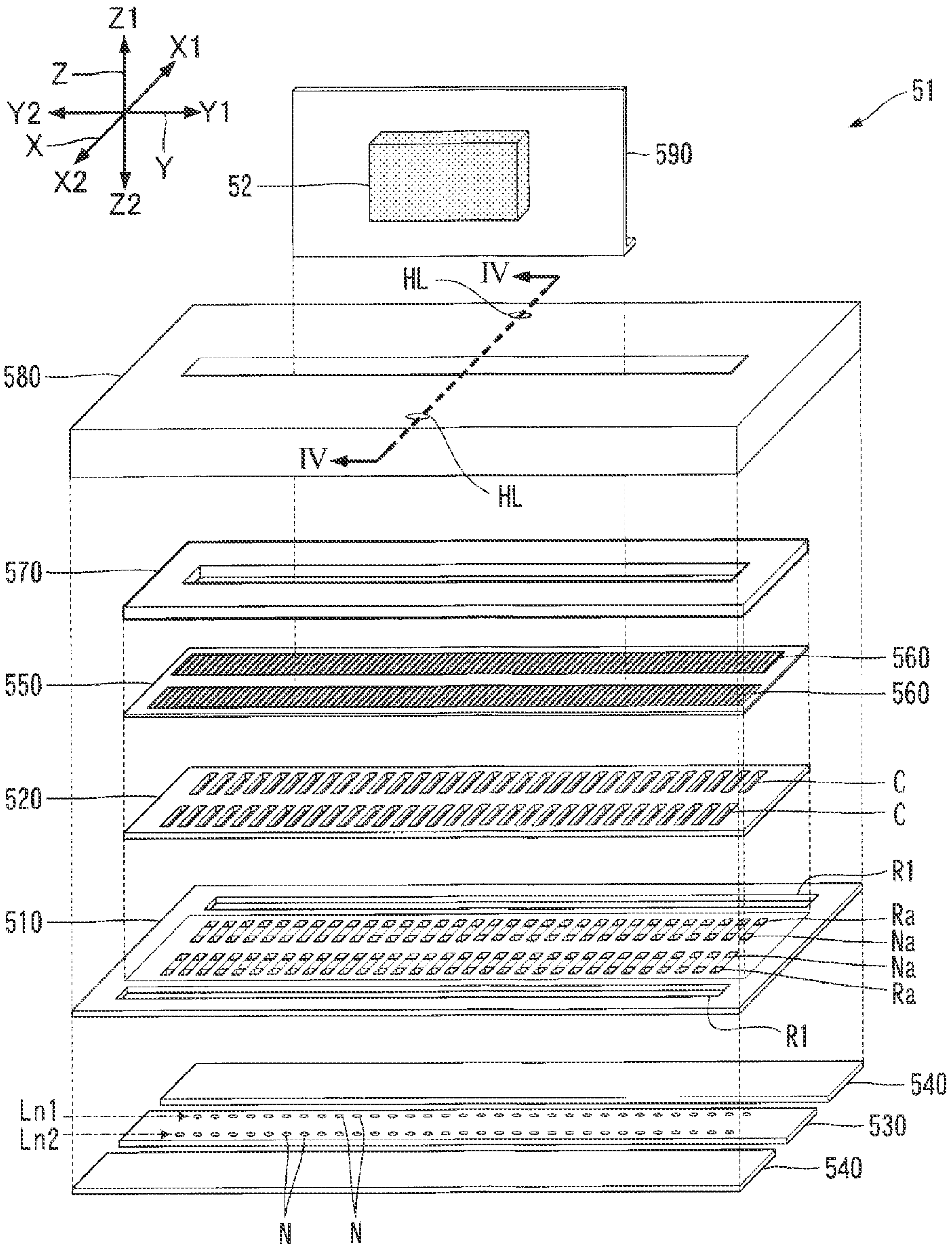
FIG. 3 is an exploded perspective view of a head chip according to the first embodiment.
Figure 4:
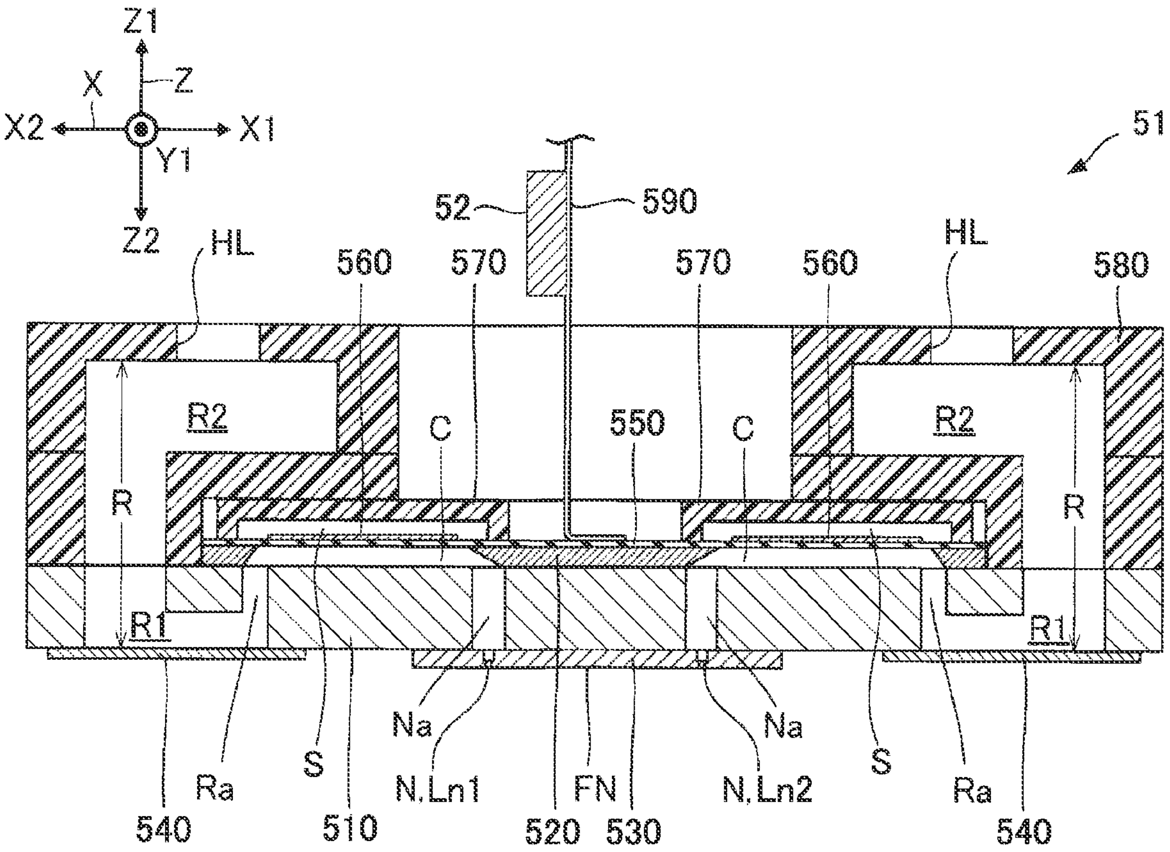
FIG. 4 is a cross-sectional view of the head chip according to the first embodiment.

FIG. 3 is an exploded perspective view of the head chip 51 according to the first embodiment. FIG. 4 is a cross-sectional view of the head chip 51 according to the first embodiment. FIG. 4 is a cross-sectional view taken along the line IV-IV in FIG. 3.

As illustrated in FIGS. 3 and 4, the head chip 51 has the plurality of nozzles N arranged in a direction along the Y axis.

The plurality of nozzles N included in the head chip 51 are divided into a first nozzle row Ln1 and a second nozzle row Ln2 arranged at a distance in a direction along the X axis. Each of the first nozzle row Ln1 and the second nozzle row Ln2 is a set of the plurality of nozzles N linearly arranged in the direction along the Y axis.

The head chip 51 has a substantially symmetrical configuration in the direction along the X axis. Note that positions of the plurality of nozzles N of the first nozzle row Ln1 and the plurality of nozzles N of the second nozzle row Ln2 in the direction along the Y axis may coincide with or may be different from each other. FIGS. 3 and 4 illustrates a configuration in which the positions of the plurality of nozzles N of the first nozzle row Ln1 and the plurality of nozzles N of the second nozzle row Ln2 coincide with each other in the direction along the Y axis.

As illustrated in FIGS. 3 and 4, the head chip 51 has a flow path substrate 510, a pressure chamber substrate 520, a nozzle substrate 530, a vibration absorbing body 540, a diaphragm 550, the plurality of piezoelectric elements 560, a protective substrate 570, a case 580, and a wiring substrate 590.

The flow path substrate 510 and the pressure chamber substrate 520 are laminated in this order in the Z1 direction, and form a flow path for supplying an ink to the plurality of nozzles N. The diaphragm 550, the plurality of piezoelectric elements 560, the protective substrate 570, the case 580, the wiring substrate 590, and the drive circuit 52 are installed in a region that is located in the Z1 direction with respect to a laminate of the flow path substrate 510 and the pressure chamber substrate 520. On the other hand, the nozzle substrate 530 and the vibration absorbing body 540 are installed in a region that is located in the Z2 direction with respect to the laminate. Each element of the head chip 51 is schematically a plate-shaped member elongated in the Y direction, and the elements are joined to each other by, for example, using an adhesive. Hereinafter, each element of the head chip 51 will be described in order.

The nozzle substrate 530 is a plate-shaped member provided with the plurality of nozzles N of each of the first nozzle row Ln1 and the second nozzle row Ln2. Each of the plurality of nozzles N is a through-hole through which an ink passes. Here, a surface of the nozzle substrate 530 facing the Z2 direction is a nozzle surface FN. The nozzle substrate 530 is manufactured by processing a silicon single crystal substrate by, for example, a semiconductor manufacturing technology using a processing technique such as dry etching or wet etching. Note that other known methods and materials may be appropriately used for manufacturing the nozzle substrate 530. In addition, a cross-sectional shape of the nozzle is typically a circular shape, but the shape is not limited to this, and may be a non-circular shape such as a polygon or an ellipse.

The flow path substrate 510 is provided with a space R1, a plurality of supply flow paths Ra, and a plurality of communication flow paths Na for each of the first nozzle row Ln1 and the second nozzle row Ln2. The space R1 is an elongated opening extending in the direction along the Y axis in plan view in a direction along the Z axis. Each of the supply flow path Ra and the communication flow path Na is a through-hole formed for each nozzle N. Each supply flow path Ra communicates with the space R1.

The pressure chamber substrate 520 is a plate-shaped member in which a plurality of pressure chambers C called cavities are provided for each of the first nozzle row Ln1 and the second nozzle row Ln2. The plurality of pressure chambers C are arranged in the direction along the Y axis. Each of the pressure chambers C is formed for each nozzle N, and is an elongated space extending in the direction along the X axis in plan view.

Each of the flow path substrate 510 and the pressure chamber substrate 520 is manufactured by processing a silicon single crystal substrate by, for example, a semiconductor manufacturing technology in the same manner as the nozzle substrate 530 described above. Note that other known methods and materials may be appropriately used for manufacturing each of the flow path substrate 510 and the pressure chamber substrate 520.

The pressure chamber C is located between the flow path substrate 510 and the diaphragm 550. The plurality of pressure chambers C are arranged in the direction along the Y axis for each of the first nozzle row Ln1 and the second nozzle row Ln2. In addition, the pressure chamber C communicates with each of the communication flow path Na and the supply flow path Ra. Therefore, the pressure chamber C communicates with the nozzle N via the communication flow path Na, and communicates with the space R1 via the supply flow path Ra.

The diaphragm 550 is disposed on a surface of the pressure chamber substrate 520 facing the Z1 direction. The diaphragm 550 is a plate-shaped member that can vibrate elastically. Details of the diaphragm 550 will be described below with reference to FIGS. 5 to 7.

The plurality of piezoelectric elements 560 corresponding to the nozzles N are disposed on a surface of the diaphragm 550 facing the Z1 direction for each of the first nozzle row Ln1 and the second nozzle row Ln2. Each of the piezoelectric elements 560 is a passive element that is deformed by the supply of the supply drive signal Vin corresponding to the drive signal Com, and causes a pressure fluctuation in the ink in the pressure chamber C. Each of the piezoelectric elements 560 has an elongated shape extending in the direction along the X axis in plan view. The plurality of piezoelectric elements 560 are arranged in a direction along the Y axis so as to correspond to the plurality of pressure chambers C. The piezoelectric element 560 overlaps the pressure chamber C in plan view. Details of the piezoelectric element 560 will be described below with reference to FIGS. 5 to 7.

The protective substrate 570 is a plate-shaped member installed on the surface of the diaphragm 550 facing the Z1 direction, protects the plurality of piezoelectric elements 560, and reinforces a mechanical strength of the diaphragm 550. Here, the plurality of piezoelectric elements 560 are accommodated in a space S between the protective substrate 570 and the diaphragm 550. The protective substrate 570 is made of, for example, a resin material.

The case 580 is a case for storing an ink to be supplied to the plurality of pressure chambers C. The case 580 is made of, for example, a resin material. The case 580 is provided with a space R2 for each of the first nozzle row Ln1 and the second nozzle row Ln2. The space R2 is a space communicating with the above-described space R1, and functions as a reservoir R that stores the ink to be supplied to the plurality of pressure chambers C together with the space R1. The case 580 is provided with an inlet HL for supplying the ink to each reservoir R. The ink in each reservoir R is supplied to the pressure chamber C via each supply flow path Ra.

The vibration absorbing body 540 is also called a compliance substrate, is a flexible resin film forming a wall surface of the reservoir R, and absorbs the pressure fluctuation in the ink in the reservoir R. The vibration absorbing body 540 may be a flexible thin plate made of metal. A surface of the vibration absorbing body 540 facing the Z1 direction is joined to the flow path substrate 510 by using an adhesive or the like.

The wiring substrate 590 is mounted on the surface of the diaphragm 550 facing the Z1 direction, and is a mounting component for electrically coupling the control module 20 and the head chip 51. The wiring substrate 590 is, for example, a flexible wiring substrate such as a chip on film (COF), a flexible printed circuit (FPC) or a flexible flat cable (FFC). The drive circuit 52 described above is mounted on the wiring substrate 590 of the present embodiment. The wiring substrate 590 may be a rigid substrate. In this case, the drive circuit 52 is mounted on the rigid substrate or on a flexible substrate coupled to the rigid substrate.

Figure 5:
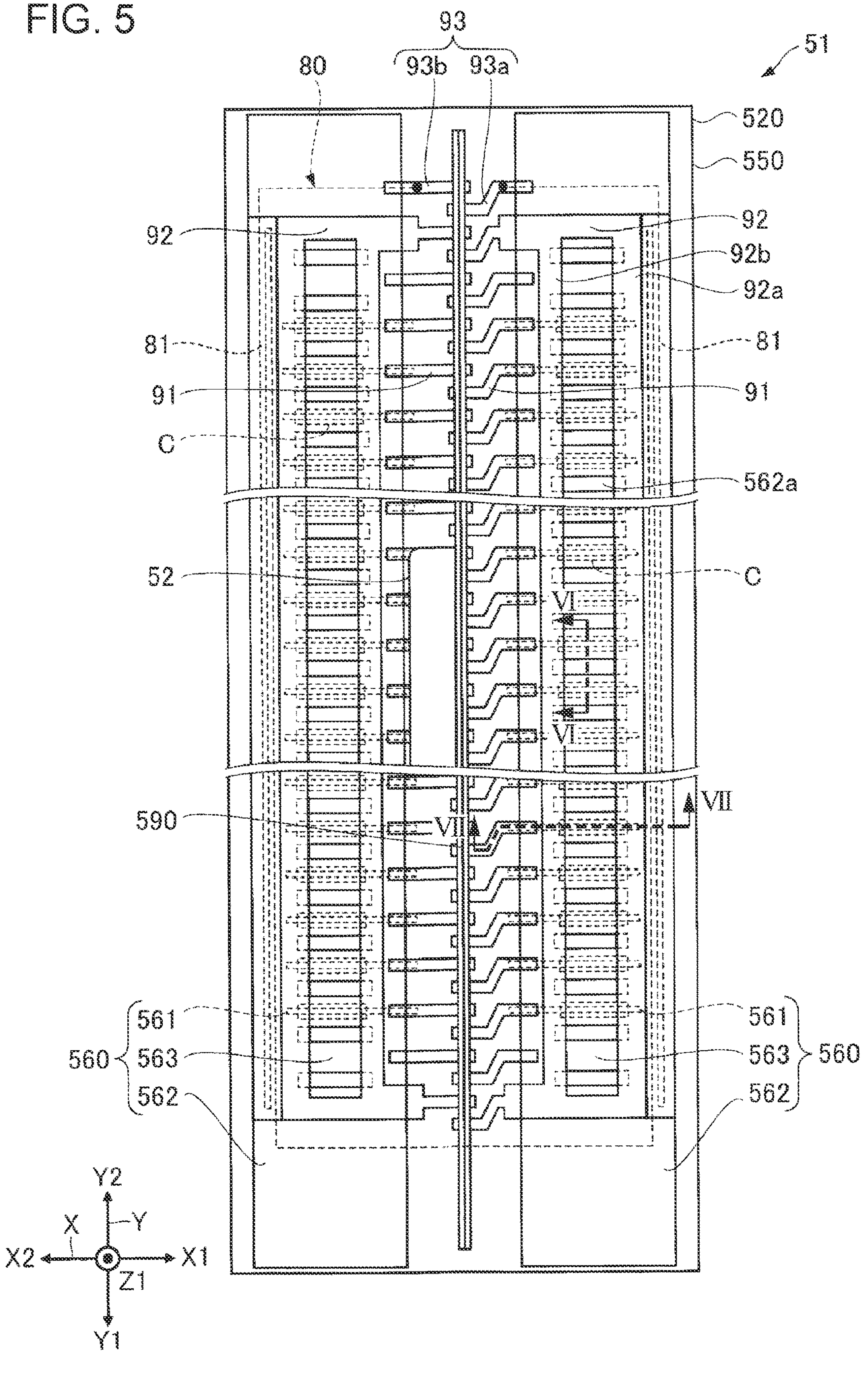
FIG. 5 is a plan view of the head chip according to the first embodiment.
Figure 6:
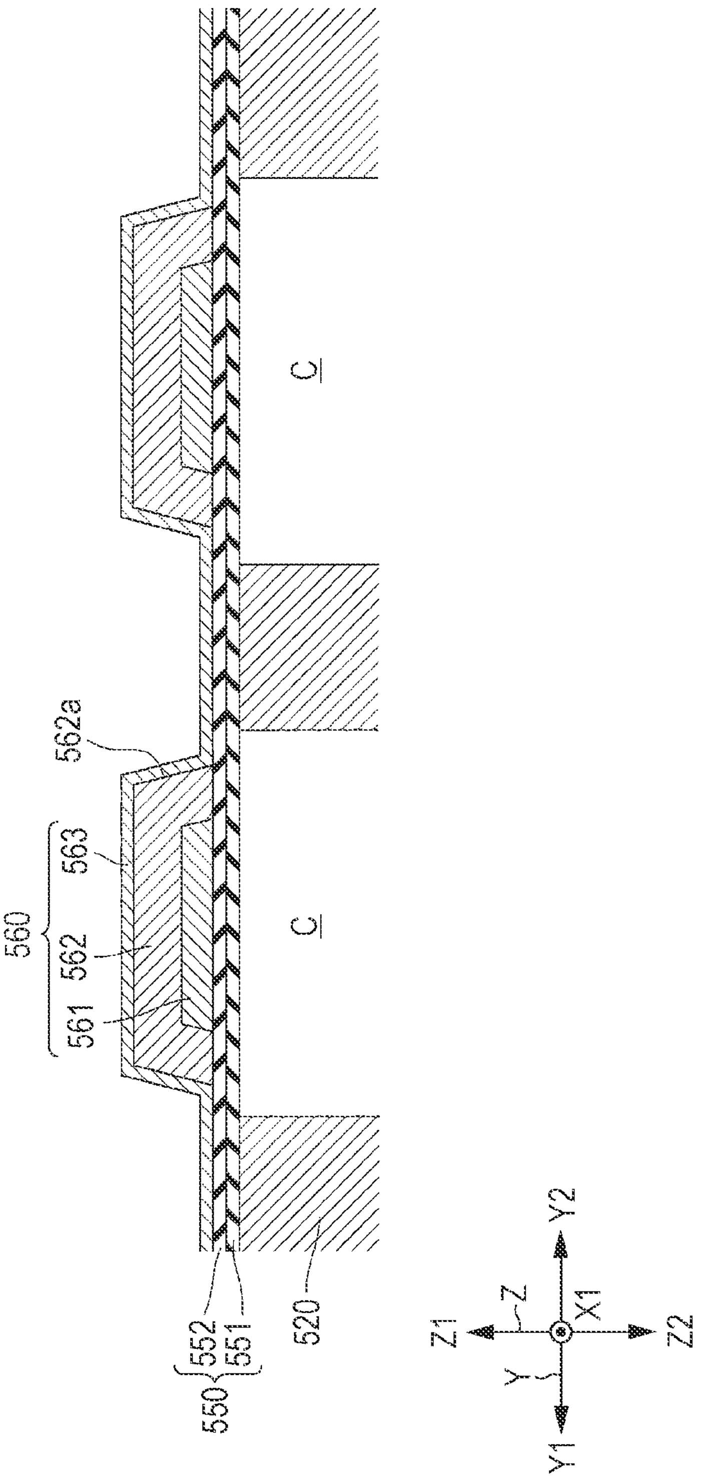
FIG. 6 is a cross-sectional view taken along the line VI-VI in FIG. 5.
Figure 7:
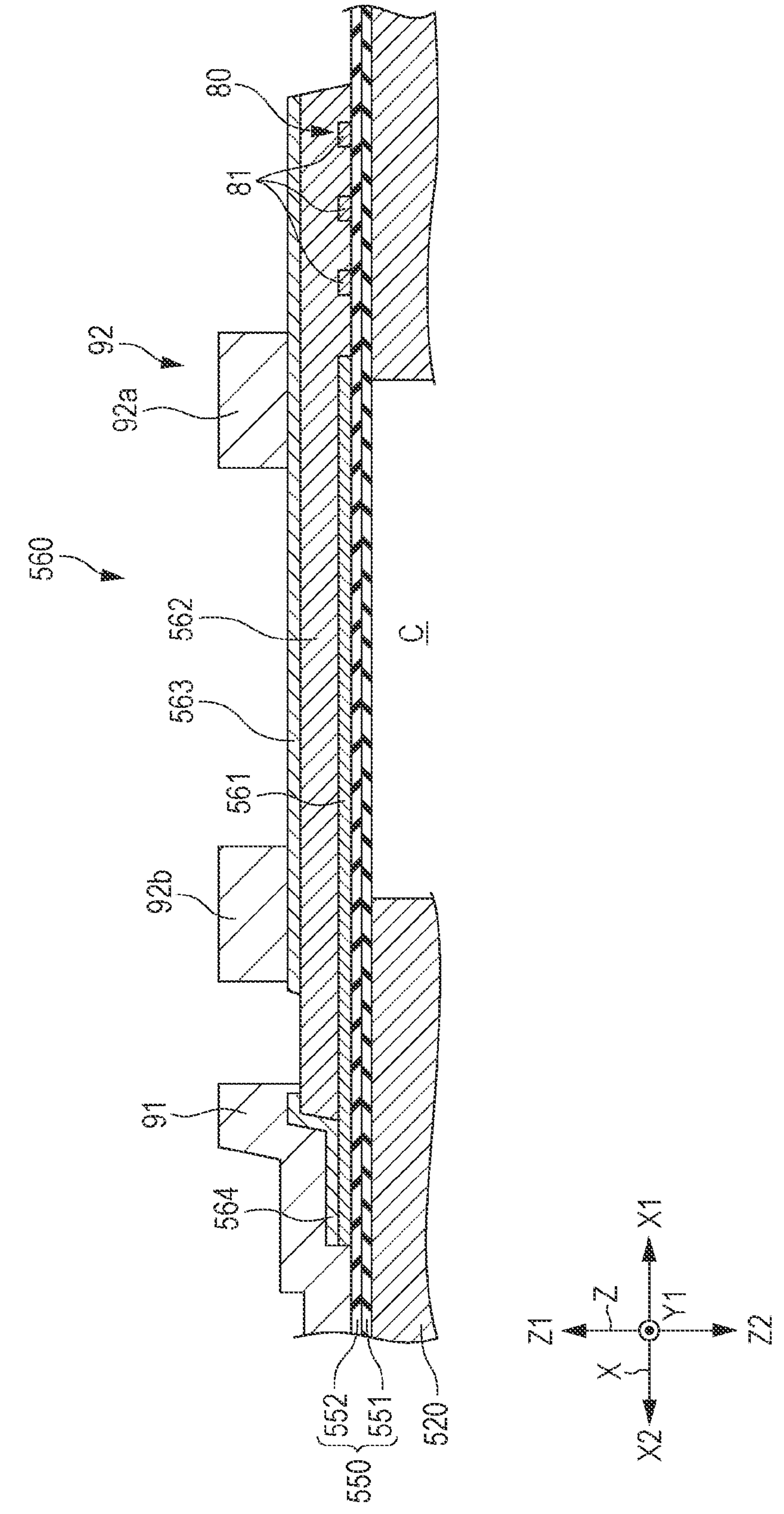
FIG. 7 is a cross-sectional view taken along the line VII-VII in FIG. 5.

FIG. 5 is a plan view of the head chip 51 according to the first embodiment. FIG. 6 is a cross-sectional view taken along the line VI-VI in FIG. 5. FIG. 7 is a cross-sectional view taken along the line VII-VII in FIG. 5. In these drawings, for convenience of description, an element electrically coupled to the wiring substrate 590 on the diaphragm 550 and related elements thereof among the elements constituting the head chip 51 are typically illustrated.

As illustrated in FIGS. 5 to 7, the head chip 51 has an individual drive line 91, a common drive line 92, a detection line 93, and the resistor 80 in addition to the components described above. Here, each of the individual drive line 91 and the common drive line 92 is an example of a "drive line".

Hereinafter, first, the diaphragm 550 and the piezoelectric element 560 will be described before describing these wirings and the resistor 80.

As illustrated in FIGS. 6 and 7, the diaphragm 550 has an elastic film 551 and an insulating film 552, and these films are laminated in the Z1 direction in this order.

The elastic film 551 is made of, for example, silicon oxide ($SiO_2$), and is formed by thermally oxidizing one surface of a silicon single crystal substrate. The insulating film 552 is made of, for example, zirconium oxide ($ZrO_2$), and is formed by forming a zirconium layer by sputtering and thermally oxidizing the layer.

The diaphragm 550 is not limited to the above-described configuration in which the elastic film 551 and the insulating film 552 are laminated, and may be configured of, for example, a single layer or three or more layers. In addition, the material of each layer constituting the diaphragm 550 is not limited to the above-described material, and may be, for example, silicon or silicon nitride.

The plurality of piezoelectric elements 560 are disposed on the surface of the diaphragm 550 facing the Z1 direction. As illustrated in FIGS. 6 and 7, each piezoelectric element 560 has a first electrode 561, a piezoelectric body 562, and a second electrode 563, which are laminated in this order in the Z1 direction.

The first electrodes 561 are individual electrodes disposed to be separated from each other for the respective piezoelectric elements 560. The supply drive signal Vin corresponding to the drive signal Com is supplied to the first electrode 561. The second electrode 563 is a band-shaped common electrode extending in the direction along the Y axis to be continuous over the plurality of piezoelectric elements 560. The second electrode 563 is supplied with, for example, a constant potential. Examples of a metal material of these electrodes include a metal material such as platinum (Pt), aluminum (Al), nickel (Ni), gold (Au), and copper (Cu). Among these materials, one type can be used alone, or two or more types can be used in combination in a form of an alloy or a laminate.

The piezoelectric body 562 is made of a piezoelectric material such as lead zirconate titanate ($Pb(Zr,Ti)O_3$). In the example illustrated in FIG. 5, the piezoelectric body 562 has a band shape extending in the direction along the Y axis to be continuous over the plurality of piezoelectric elements 560. Here, the piezoelectric body 562 is provided with a through-hole 562*a* penetrating the piezoelectric body 562, which extends in the direction along the X axis, in a region corresponding to a gap between the pressure chambers C adjacent to each other in plan view. The piezoelectric body 562 may be individually provided for each piezoelectric element 560.

As illustrated in FIG. 7, the piezoelectric element 560 of the present embodiment has a wiring portion 564 in addition to the first electrode 561, the piezoelectric body 562, and the second electrode 563, which are described above. The wiring portion 564 is individually provided for each piezoelectric element 560, and is disposed to straddle the piezoelectric body 562 and the first electrode 561 at a position closer to the wiring substrate 590 than the second electrode 563, with a distance with respect to the second electrode 563. The wiring portion 564 is preferably collectively formed with the second electrode 563 through the same film formation process. In this case, a manufacturing process of the head chip 51 can be simplified, and as a result, a cost of the head chip 51 can be reduced.

In such a piezoelectric element 560, the piezoelectric body 562 is deformed by an inverse piezoelectric effect by applying a voltage between the first electrode 561 and the second electrode 563. When the diaphragm 550 vibrates in conjunction with this deformation, the pressure in the pressure chamber C fluctuates, which causes the ink to be discharged from the nozzle N.

As illustrated in FIG. 5, the piezoelectric element 560 described above is electrically coupled to the wiring substrate 590 via the individual drive line 91 and the common drive line 92.

The individual drive line 91 is individually provided for each piezoelectric element 560, and is electrically coupled to the first electrode 561 of the corresponding piezoelectric element 560. On the other hand, the common drive line 92 is provided in common to the plurality of piezoelectric elements 560, and is electrically coupled to the second electrode 563.

The individual drive line 91 and the common drive line 92 are disposed at a distance from each other. Here, the individual drive line 91 and the common drive line 92 are preferably collectively formed through the same film formation process. In this case, a manufacturing process of the head chip 51 can be simplified, and as a result, a cost of the head chip 51 can be reduced.

The constituent materials of each of the individual drive line 91 and the common drive line 92 are not particularly limited as long as they are conductive materials, and examples thereof include metals such as gold (Au), copper (Cu), titanium (Ti), tungsten (W), nickel (Ni), chromium (Cr), platinum (Pt), and aluminum (Al). Among these, gold (Au) is preferably used as the constituent material of the individual drive line 91 and the common drive line 92. The individual drive line 91 and the common drive line 92 may have an adhesion layer for improving adhesion with the first electrode 561, the second electrode 563, and the diaphragm 550.

In the present embodiment, as illustrated in FIG. 7, the individual drive line 91 is coupled to the first electrode 561 via the wiring portion 564, and extends from a top of the wiring portion 564 and reaches the diaphragm 550 in a direction toward the wiring substrate 590, for each piezoelectric element 560.

On the other hand, as illustrated in FIG. 5, the common drive line 92 extends from a top of the second electrode 563 and reaches the diaphragm 550 in the direction toward the wiring substrate 590, at both end portions of the second electrode 563 in the Y1 direction and in the Y2 direction. Here, the common drive line 92 has a pair of portions 92*a* and 92*b* extending in the direction along the Y axis. The portion 92*a* of the common drive line 92 overlaps an end farther from the wiring substrate 590 out of both ends of the pressure chamber C in the direction along the X axis, when viewed in the direction along the Z axis. On the other hand, the portion 92*b* of the common drive line 92 overlaps an end closer to the wiring substrate 590 out of both ends of the pressure chamber C in the direction along the X axis, when viewed in the direction along the Z axis. As can be understood from the above, each of the portions 92*a* and 92*b* extends in the direction along the Y axis over the plurality of pressure chambers C arranged in the direction along the Y axis.

The resistor 80 is a resistance line for detecting the temperature of the ink in the pressure chamber C, and has a characteristic that the resistance value changes according to the change in temperature. Therefore, the resistor 80 is made of a material whose electric resistance value is dependent on the temperature. Note that the resistor 80 is made of the same material as any of the first electrode 561, the second electrode 563, the individual drive line 91, and the common drive line 92. Specifically, examples of the material constituting the resistor 80 include metals such as gold (Au), platinum (Pt), iridium (Ir), aluminum (Al), copper (Cu), titanium (Ti), tungsten (W), nickel (Ni), and chromium (Cr). Among these, platinum (Pt) is preferably adopted as the material constituting the resistor 80 because its resistance value change due to a change in temperature is larger than that of other metals and highly accurate temperature detection is possible.

As illustrated in FIG. 5, the resistor 80 is disposed at a distance from the individual drive line 91 and the common drive line 92 described above. In the example illustrated in FIG. 5, the resistor 80 is disposed at a position that does not overlap the pressure chamber C when viewed in the direction along the Z axis. Therefore, the temperature of the pressure chamber C can be detected by using the resistor 80 without being affected by the deformation of the diaphragm 550. The resistor 80 may be disposed at a position overlapping the pressure chamber C when viewed in the direction along the Z axis. In this case, correction processing in consideration of the deformation of the diaphragm 550 is used for temperature detection using the resistor 80, as necessary.

In the example illustrated in FIG. 5, the resistor 80 has a shape that extends to surround the whole of the plurality of pressure chambers C corresponding to the first nozzle row Ln1 and the plurality of pressure chambers C corresponding to the second nozzle row Ln2, when viewed in the direction along the Z axis. Here, as illustrated in FIGS. 5 and 7, the resistor 80 has a plurality of portions 81 extending in the direction along the Y axis for each nozzle row of the first nozzle row Ln1 and the second nozzle row Ln2. The plurality of portions 81 are arranged at distances from each other in the direction along the X axis. One-side ends of two portions 81 adjacent to each other among the plurality of portions 81 are alternately coupled to each other. Thereby, the resistor 80 has a portion having a meandering shape. Therefore, a length of the resistor 80 can be increased as compared with a configuration without the portion. As a result, the change in the resistance value of the resistor 80 with respect to the change in temperature becomes large, so that the accuracy of the temperature detection using the resistor 80 can be improved. A shape of the resistor 80 in plan view is not limited to the example illustrated in FIG. 5, and may be set in any desired way.

In the example shown in FIG. 7, the resistor 80 is disposed between the diaphragm 550 and the piezoelectric body 562, and is in contact with each of the diaphragm 550 and the piezoelectric body 562. In such a configuration, there is an advantage that the accuracy of the temperature detection using the resistor 80 can be easily improved as compared with a configuration in which the resistor 80 is disposed on a surface of the piezoelectric body 562 facing the Z1 direction. The disposition of the resistor 80 may be any position as long as the resistor 80 is in a position to be a part of the head chip 51, and is not limited to the disposition illustrated in FIG. 7. For example, the resistor 80 may be disposed on the surface of the piezoelectric body 562 facing the Z1 direction, or may be disposed on the diaphragm 550 without being disposed between the diaphragm 550 and the piezoelectric body 562.

Here, the resistor 80 of the present embodiment is disposed at a distance from the first electrode 561, but is preferably collectively formed with the first electrode 561 through the same film formation process. In this case, a manufacturing process of the head chip 51 can be simplified, and as a result, a cost of the head chip 51 can be reduced.

The above resistor 80 is electrically coupled to the wiring substrate 590 via a detection line 93. The detection line 93 has a detection line 93*a* coupled to one end of the resistor 80 and a detection line 93*b* coupled to the other end of the resistor 80. The detection lines 93*a* and 93*b* are electrically coupled to the detection circuit 53 via the wiring substrate 590. Therefore, the current Id can be supplied from the detection circuit 53 to the resistor 80 or the potential Vd of the resistor 80 can be detected by the detection circuit 53, via the detection lines 93*a* and 93*b*.

The detection line 93 including the detection line 93*a* and the detection line 93*b* is disposed at a distance from the individual drive line 91 and the common drive line 92, but is preferably collectively formed with the individual drive line 91 and the common drive line 92 through the same film formation process. In this case, a manufacturing process of the head chip 51 can be simplified, and as a result, a cost of the head chip 51 can be reduced.

The materials constituting the detection line 93 are not particularly limited as long as they are conductive materials, and examples thereof include metals such as gold (Au), copper (Cu), titanium (Ti), tungsten (W), nickel (Ni), chromium (Cr), platinum (Pt), and aluminum (Al). Among these, from the viewpoint that the constituent materials of the detection line 93 are the same as the constituent materials of the individual drive line 91 and the common drive line 92, gold (Au) is preferable as the constituent materials of the detection line 93. The detection line 93 may have an adhesion layer for improving adhesion with the resistor 80 or the diaphragm 550, as with the individual drive line 91 and the common drive line 92.

A4: Printing Process and Detection Process

Figure 8:
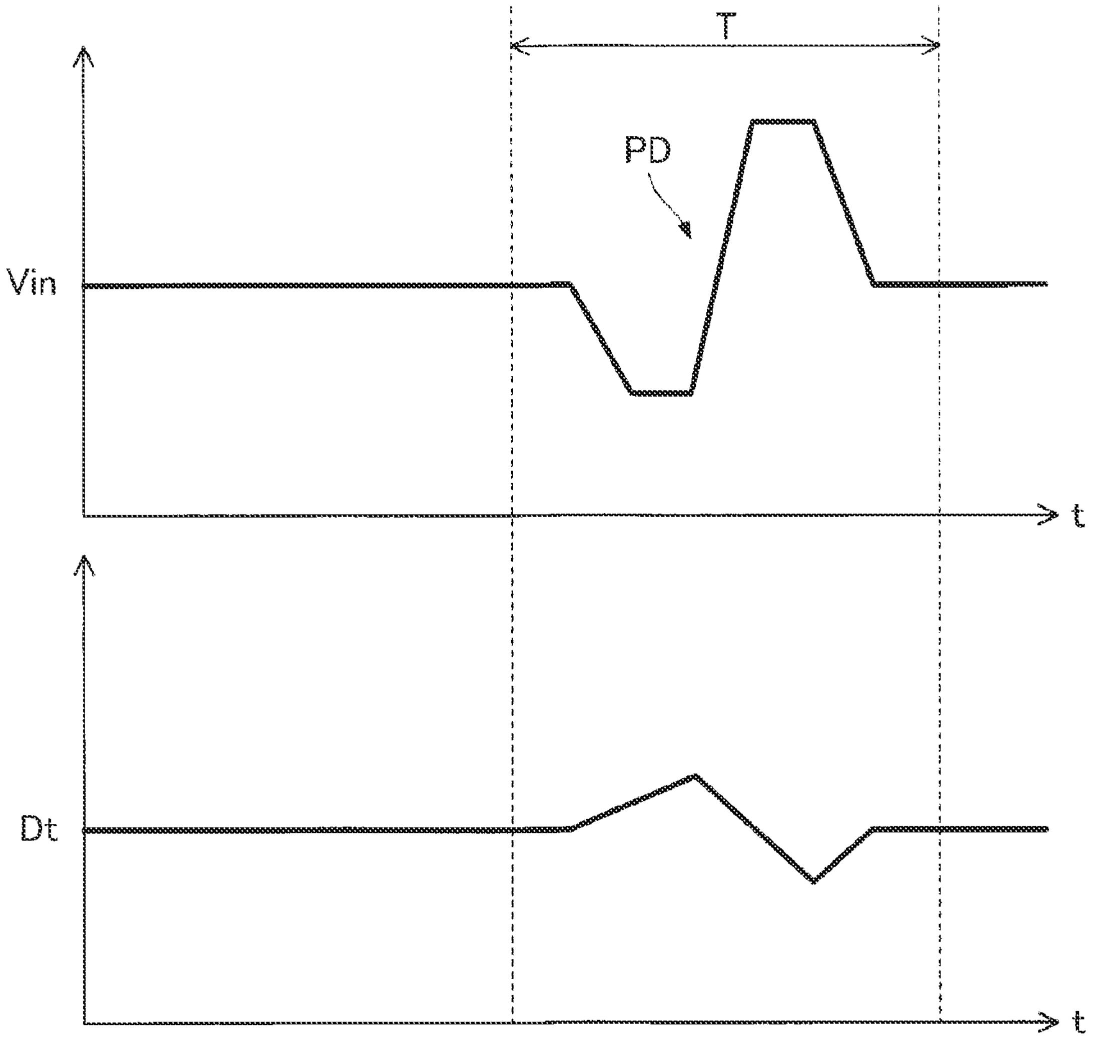
FIG. 8 is a diagram illustrating respective changes with time in a supply drive signal supplied to a piezoelectric element and a detection signal based on a potential of a resistor.

FIG. 8 is a diagram illustrating respective changes with time in the supply drive signal Vin supplied to the piezoelectric element 560 and the detection signal Dt based on the potential Vd of the resistor 80. In FIG. 8, a horizontal axis indicates time t, a vertical axis in an upper part indicates the supply drive signal Vin, and a vertical axis in a lower part indicates the detection signal Dt.

As illustrated in FIG. 8, the supply drive signal Vin in an execution period T of a printing process includes a pulse PD of the drive signal Com. The pulse PD is a potential pulse for driving the piezoelectric element 560 to cause the pressure fluctuation in the ink in the pressure chamber C to the extent that the ink is discharged from the nozzle N. A waveform of the pulse PD is not limited to the example illustrated in FIG. 8 and may be set in any desired way as long as it can cause the pressure fluctuation in the ink in the pressure chamber C to the extent that the ink is discharged from the nozzle N.

Here, in the execution period T of the printing process, noise caused by the pulse PD is mixed into the detection signal Dt. This is because the resistor 80 is disposed at a position extremely close to the piezoelectric element 560 in the liquid discharge head 50. Therefore, during the execution period T of the printing process, the accuracy of the temperature detection using the resistor 80 decreases.

Therefore, in the present embodiment, the temperature detection using the resistor 80 is performed during a period different from the execution period T of the printing process. Hereinafter, this point will be described in detail.

Figure 9:
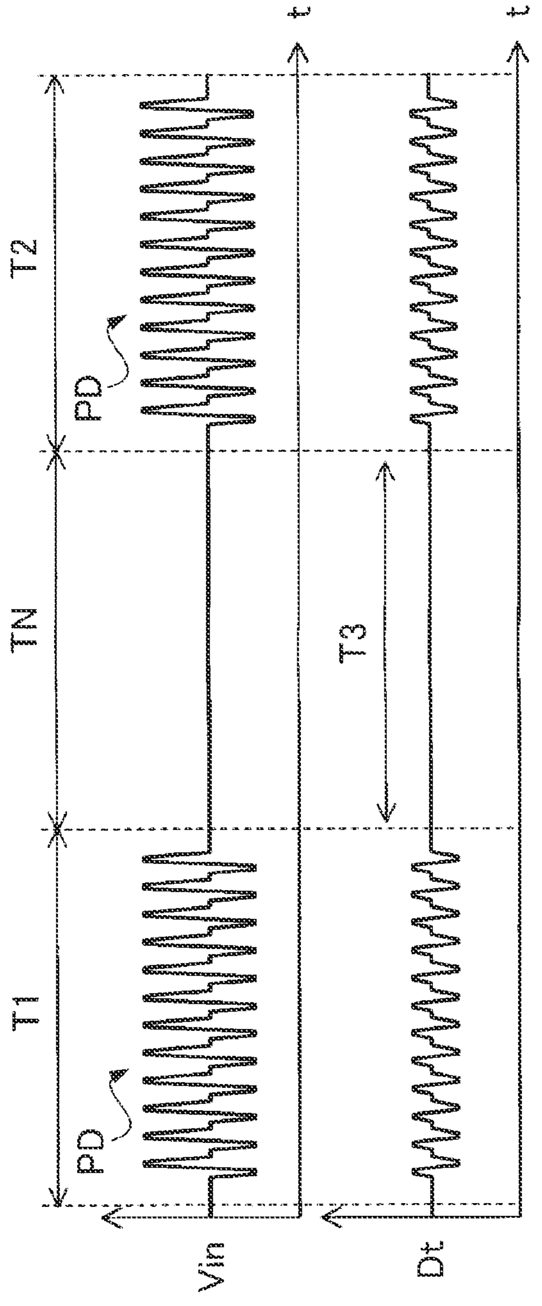
FIG. 9 is a diagram illustrating a relationship between execution periods of a first printing process, a second printing process, a non-printing process, and potential detection in the first embodiment.

FIG. 9 is a diagram illustrating a relationship between execution periods of a first printing process, a second printing process, a non-printing process, and potential detection in the first embodiment. In FIG. 9, a horizontal axis indicates time t, a vertical axis in an upper part indicates the supply drive signal Vin, and a vertical axis in a lower part indicates the detection signal Dt.

In the first printing process, the first image is printed on the recording medium M by the ink discharged from the nozzles N. In the second printing process, the second image is printed on the recording medium M by the ink discharged from the nozzles N.

In the present embodiment, since the liquid discharge apparatus 100 is a serial type as described above, a target image is printed on the recording medium M while reciprocating the liquid discharge head 50 a plurality of times in the X1 direction and in the X2 direction. Here, in each of a forward path and a return path of the liquid discharge head 50, images obtained by appropriately dividing the target image are printed on the recording medium M.

Here, printing in the forward path of the liquid discharge head 50 is an example of a “first printing process”, and the image printed on the recording medium M in the forward path of the liquid discharge head 50 is an example of a “first image”. In addition, printing in the return path of the liquid discharge head 50 is an example of a “second printing process”, and the image printed on the recording medium M in the return path of the liquid discharge head 50 is an example of a “second image”.

As described above, during an execution period T1 of the first printing process, the liquid discharge head 50 moves in the X1 direction. During an execution period T2 of the second printing process, the liquid discharge head 50 moves in the X2 direction opposite to the X1 direction.

In the example illustrated in FIG. 9, the second printing process is executed after the execution of the first printing process. Here, between the execution period T1 of the first printing process and the execution period T2 of the second printing process, a non-printing process of preventing a liquid from being discharged toward the recording medium M is executed. During an execution period TN of the non-printing process, the recording medium M moves in the Y1 direction intersecting the X1 direction or the X2 direction. That is, during the execution period TN of the non-printing process, a paper feeding operation or a line feeding operation, which is one operation during the printing operation of the serial type liquid discharge apparatus 100, is performed. In addition, a direction change operation of movement of the liquid discharge head 50 along the X axis direction is performed.

During each of the execution period T1 of the first printing process and the execution period T2 of the second printing process, the supply drive signal Vin includes the pulse PD, and the piezoelectric element 560 is driven so that an ink is discharged from the nozzle N. The number of the pulses PD included in the supply drive signal Vin in the execution periods T1 and T2 is not limited to the example illustrated in FIG. 9, and is set in any desired way.

During the execution period TN of the non-printing process, a detection process of detecting the potential of the resistor 80 is performed over a period T3. This detection process is executed in a state where the state of the potential applied to the individual drive line 91 and the common drive line 92 is in a state of causing no liquid to be discharged from the nozzle N. Therefore, noise is prevented from being mixed into the detection signal Dt as described above.

Here, a potential with a smaller potential change than the drive signal Com is applied to the individual drive line 91 and the common drive line 92 over the period T3. In the example illustrated in FIG. 9, no potential is applied to the individual drive line 91 and the common drive line 92 over the period T3. For example, under the control of the control module 20, the drive circuit 52 switches to a state in which a signal line of the drive signal Com and a signal line of the supply drive signal Vin are not coupled to each other. Alternatively, a constant potential is applied to the individual drive line 91 and the common drive line 92 over the period T3. For example, under the control of the control module 20, the drive circuit 52 performs switching such that the signal line of the drive signal Com and the signal line of the supply drive signal Vin are not coupled to each other in the period including the pulse PD of the drive signal Com, and that the signal line of the drive signal Com and the signal line of the supply drive signal Vin are coupled to each other in the period in which the potential not including the pulse PD of the drive signal Com is maintained constant. Alternatively, under the control of the control module 20, the drive circuit 52 switches to a state in which a signal line of the drive signal Com, which maintains a constant potential, other than the drive signal Com and the signal line of the supply drive signal Vin are coupled to each other. The period T3 need only be within the execution period TN of the non-printing process, is not limited to the example illustrated in FIG. 9, and is set in any desired way. In addition, the potential applied to the individual drive line 91 and the common drive line 92 over the period T3 need only be a potential with a smaller potential change than the drive signal Com, is not limited to the example illustrated in FIG. 9, and is set in any desired way.

As described above, the potential of the resistor 80 is detected by the detection circuit 53. The detection circuit 53 outputs the detection signal Dt based on the potential Vd of the resistor 80. The correction portion 21*a* corrects the drive signal Com or adjusts a set temperature of the heater 70, based on the detection signal Dt.

As described above, the liquid discharge head 50 includes the nozzle N, the pressure chamber C, the piezoelectric element 560, the individual drive line 91 and the common drive line 92 which are an example of the "drive line", and the resistor 80. The pressure chamber C communicates with the nozzle N. The piezoelectric element 560 applies a pressure to the liquid in the pressure chamber C. The individual drive line 91 and the common drive line 92 are coupled to the piezoelectric element 560. The resistor 80 is a resistor for measuring the temperature of the liquid in the pressure chamber C.

Here, the piezoelectric element 560 has the first electrode 561, the second electrode 563, and the piezoelectric body 562 disposed between the first electrode 561 and the second electrode 563. The resistor 80 is made of the same material as any of the first electrode 561, the second electrode 563, the individual drive line 91, and the common drive line 92.

In the above-described temperature detection method of the liquid discharge head 50, the non-printing process is executed after the execution of the first printing process and before the execution of the second printing process, and the potential Vd of the resistor 80 is detected in a state where the state of the potential applied to the individual drive line 91 and the common drive line 92 is in a state of causing no liquid to be discharged from the nozzle N, during the execution period TN of the non-printing process. Here, the first printing process is a process of printing the first image on the recording medium M by the liquid discharged from the nozzles N. The second printing process is a process of printing the second image on the recording medium M by the liquid discharged from the nozzles N. The non-printing process is a process of preventing the liquid from being discharged toward the recording medium M.

In the above temperature detection method, the potential of the resistor 80 is detected in a state where the state of the potential applied to the individual drive line 91 and the common drive line 92 is in a state of causing no liquid to be discharged from the nozzle N, so that even when the resistor 80 is provided in the liquid discharge head 50, the potential of the resistor 80 can be detected with high accuracy without being affected by the supply drive signal Vin corresponding to the drive signal Com for driving the piezoelectric element 560 to discharge the ink from the nozzle N. As a result, the temperature of the liquid in the pressure chamber C can be detected with high accuracy based on the potential. Here, the detection of the potential of the resistor 80 is performed during the execution period TN of the non-printing process of executing the paper feeding operation of transporting the recording medium M and the operation of changing a scanning direction of the liquid discharge head 50 without the ink discharge operation from the nozzle N, so that a decrease in throughput of the printing process can be prevented as compared with a case where the potential of the resistor 80 is detected by providing a period during which no ink is discharged from the nozzle N to measure the temperature during the execution period T1 of the first printing process or the execution period T2 of the second printing process.

In the present embodiment, as described above, the resistor 80 has a portion that is in contact with the piezoelectric body 562. Therefore, a distance between the resistor 80 and the pressure chamber C can be shortened as compared with a configuration in which the resistor 80 is not in contact with the piezoelectric body 562. As a result, the temperature of the liquid in the pressure chamber C can be detected with high accuracy based on the potential of the resistor 80. In addition, in such a configuration, when the piezoelectric element 560 is driven, noise due to the supply drive signal Vin corresponding to the drive signal Com is likely to be mixed into the detection signal Dt based on the potential of the resistor 80, and therefore, as disclosed in the present embodiment, the effect of detecting the detecting signal Dt based on the potential of the resistor 80 when the supply drive signal Vin is in the potential state where no ink is discharged from the nozzle N becomes significant.

In addition, as described above, in the temperature detection method of the present embodiment, no potential is applied to the individual drive line 91 and the common drive line 92 over the period T3 during which the potential Vd of the resistor 80 is detected. Therefore, the potential of the resistor 80 can be detected with high accuracy without being affected by the supply drive signal Vin corresponding to the drive signal Com for driving the piezoelectric element 560.

Here, as described above, in the temperature detection method of the present embodiment, a constant potential is applied to the individual drive line 91 and the common drive line 92 over the period T3 during which the potential Vd of the resistor 80 is detected. Therefore, the potential of the resistor 80 can be detected with high accuracy without being affected by the supply drive signal Vin corresponding to the drive signal Com for driving the piezoelectric element 560.

In addition, as described above, in the temperature detection method of the present embodiment, a potential that changes not to discharge the liquid from the nozzle N is applied to the individual drive line 91 and the common drive line 92 over the period T3 during which the potential Vd of the resistor 80 is detected. Therefore, the potential of the resistor 80 can be detected with high accuracy without being affected by the supply drive signal Vin corresponding to the drive signal Com for driving the piezoelectric element 560.

Furthermore, as described above, during an execution period T1 of the first printing process, the liquid discharge head 50 moves in the X1 direction. During an execution period T2 of the second printing process, the liquid discharge head 50 moves in the X2 direction opposite to the X1 direction. During an execution period TN of the non-printing process, the recording medium M moves in the Y1 direction intersecting the X1 direction or the X2 direction. Here, the X1 direction is an example of a "first direction", the X2 direction is an example of a "second direction", and the Y1 direction is an example of a "third direction". As described above, in the serial type liquid discharge apparatus 100, the potential of the resistor 80 can be detected by using a period between passes in the multi-pass printing as the non-printing process. As a result, it is possible to enjoy the effect of the present disclosure.

In addition, as described above, in the temperature detection method of the present embodiment, the drive signal Com to be supplied to the piezoelectric element 560 in the second printing process is corrected based on a result of detecting the potential Vd of the resistor 80 in the non-printing process. Therefore, even when the change in temperature of the liquid in the pressure chamber C occurs during the period of the first printing process, the drive signal Com appropriately corrected according to the temperature detected in the period of the non-printing process immediately before the second printing process can be supplied to the piezoelectric element 560 when executing the second printing process.

Furthermore, as described above, the support section 60 that supports the recording medium M facing the nozzle N is heated to the set temperature by the heater 70. Moreover, in the temperature detection method of the present embodiment, the set temperature in the second printing process is corrected based on the result of detecting the potential Vd of the resistor 80 in the non-printing process. Therefore, when executing the second printing process, the support section 60 can be heated at an appropriate temperature according to the change in temperature of the liquid in the pressure chamber C.

B: Second Embodiment

Hereinafter, a second embodiment of the present disclosure will be described. In the embodiment illustrated below, elements whose actions and functions are similar to those of the first embodiment will be denoted by the same reference numerals used in the description of the first embodiment, and detailed description thereof will be omitted as appropriate.

Figure 10:
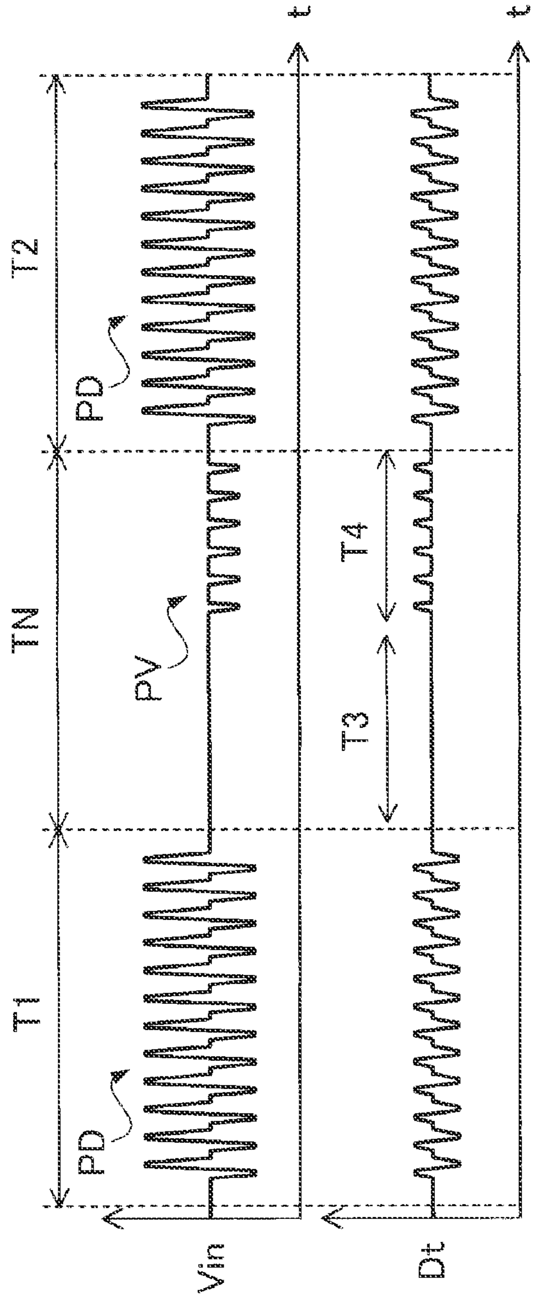
FIG. 10 is a diagram illustrating a relationship between execution periods of a first printing process, a second printing process, a non-printing process, and potential detection in a second embodiment.

FIG. 10 is a diagram illustrating a relationship between execution periods of a first printing process, a second printing process, a non-printing process, and potential detection in the second embodiment. The second embodiment is the same as the above-described first embodiment except that a minute vibration process is added, as well as the detection process during the execution period TN of the non-printing process.

During the execution period TN of the non-printing process of the present embodiment, a minute vibration process of minutely vibrating a meniscus of the ink in the nozzle N without discharging the ink from the nozzle N is performed. Thereby, thickening of the ink in the nozzle N is prevented. However, in the period T3 during which the potential Vd of the resistor 80 is detected to measure the temperature of the liquid in the pressure chamber C, the minute vibration process is not executed to prevent the noise from being mixed into the detection signal Dt. During the execution period TN of the non-printing process of the present embodiment, after the detection process over the period T3, the minute vibration process is performed over the period T4. A pulse PV is included in the supply drive signal Vin of the period T4. The pulse PV is a potential pulse for driving the piezoelectric element 560 to cause, in the pressure chamber C, the pressure fluctuation that is strong enough to prevent the ink from being discharged from the nozzle N. By supplying the pulse PV to the piezoelectric element 560, the meniscus of the ink in the nozzle N is minutely vibrated without discharging the ink from the nozzle N. The ink in the nozzle N is stirred by the minute vibration, so that the ink is smoothly replaced between the nozzle N and the communication flow path Na. Therefore, thickening of the ink in the nozzle N is prevented. A length or the like of the periods T3 and T4 is not limited to the example illustrated in FIG. 10, and is set in any desired way.

In the example illustrated in FIG. 10, the period T4 does not overlap the period T3. Therefore, the temperature detection using the resistor 80 can be performed with higher accuracy as compared with an aspect in which the period T4 overlaps the period T3. The period T4 may overlap the period T3. In this case, the temperature detection accuracy is inferior as compared with a case where the period T4 does not overlap the period T3, but the potential change of the pulse PV is smaller than the potential change of the pulse PD, so that the temperature detection using the resistor 80 can be performed with higher accuracy as compared with a case where the potential of the resistor 80 is detected during the execution periods T1 and T2.

Here, the period T4 is after the period T3 as described above, but the meniscus of the ink vibrates due to residual vibration in the nozzle N in a predetermined period immediately after the ink is discharged, so that the ink is stirred. Therefore, even when the piezoelectric element 560 is not separately driven for vibrating the meniscus of the ink in the nozzle N in the period T3, thickening of the ink in the nozzle N is prevented. The period T4 may be before the period T3. Alternatively, there may be two periods T4 before and after the period T3.

Also according to the second embodiment described above, the temperature of the liquid in the pressure chamber C of the liquid discharge head 50 can be detected with high accuracy. In the temperature detection method of the present embodiment, as described above, during the execution period TN of the non-printing process, the individual drive line 91 and the common drive line 92 is applied with a potential that changes to stir the liquid in the nozzle N without discharging the liquid from the nozzle N, over the period T4 different from the period T3 during which the potential Vd of the resistor 80 is detected. Therefore, it is possible to effectively utilize the execution period TN of the non-printing process and to stir the liquid in the nozzle N without reducing the detection accuracy of the potential of the resistor 80.

C: Third Embodiment

Hereinafter, a third embodiment of the present disclosure will be described. In the embodiment illustrated below, elements whose actions and functions are similar to those of the first embodiment will be denoted by the same reference numerals used in the description of the first embodiment, and detailed description thereof will be omitted as appropriate.

Figure 11:
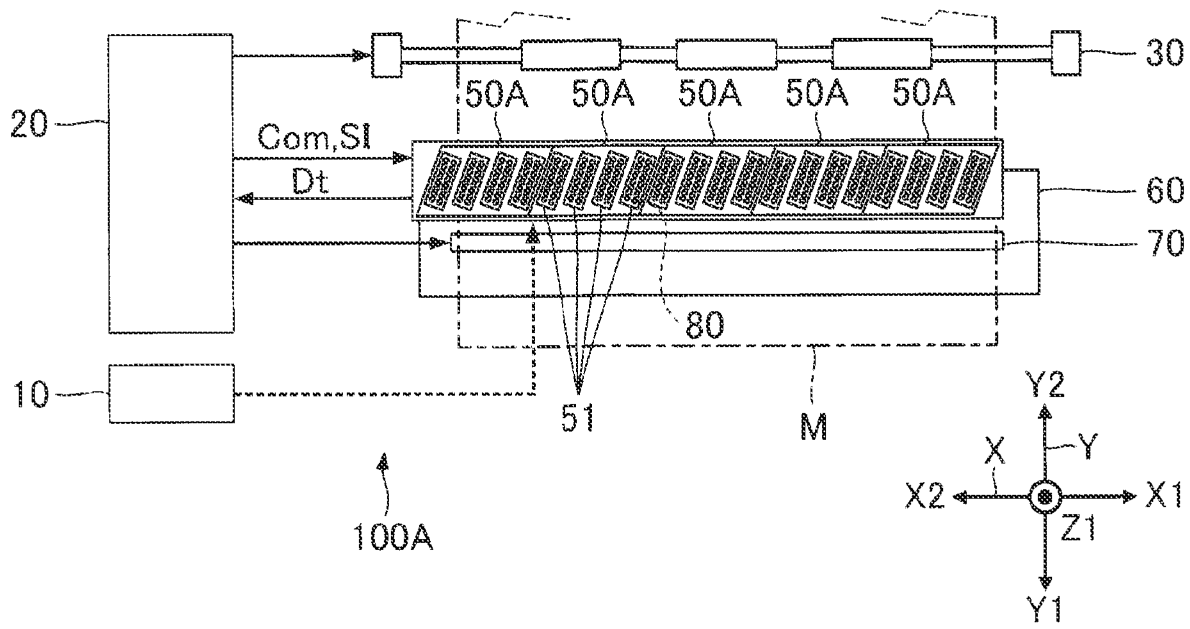
FIG. 11 is a schematic diagram illustrating a configuration example of a liquid discharge apparatus according to a third embodiment.

FIG. 11 is a schematic diagram illustrating a configuration example of a liquid discharge apparatus 100A according to the third embodiment. The liquid discharge apparatus 100A is configured in the same manner as the liquid discharge apparatus 100 of the first embodiment, except that the movement mechanism 40 is omitted and a plurality of liquid discharge heads 50A are provided instead of the liquid discharge head 50.

The liquid discharge apparatus 100A is a line type printer. The plurality of liquid discharge heads 50A included in the liquid discharge apparatus 100A are disposed such that the plurality of nozzles N are distributed throughout the entire range of the recording medium M in the direction of the X axis. Therefore, the liquid discharge heads 50A are provided over the entire region in a width direction of the recording medium M. Each liquid discharge head 50A is configured in the same manner as the liquid discharge head 50 of the first embodiment, except that the arrangement direction of the first nozzle row Ln1 and the second nozzle row Ln2 of the head chip 51 is inclined with respect to the transport direction of the recording medium M.

In the present embodiment, since the liquid discharge apparatus 100 is a line type as described above, the plurality of liquid discharge heads 50A discharge the ink toward the recording medium M while the transport mechanism 30 transports the recording medium M in the Y1 direction.

Here, when printing of a plurality of pages is performed, out of the two pages selected from the plurality of pages, printing of the preceding page is an example of the "first printing process", and printing of the subsequent page is an example of the "second printing process". In addition, a printed image of the preceding page is an example of the "first image", and a printed image of the subsequent page is an example of the "second image". The two pages of the plurality of pages may be regions of one recording medium M such as roll paper, or may be regions of individual recording media M.

Then, in the period after the execution of the first printing process and before the execution of the second printing process, the non-printing process of preventing a liquid from being discharged toward the recording medium M is executed. In the present embodiment, during the execution period TN of the non-printing process, a paper feeding operation, which is one operation during the printing operation of the line type liquid discharge apparatus 100A, is performed.

Also according to the third embodiment described above, the temperature of the liquid in the pressure chamber C of the liquid discharge head 50A can be detected with high accuracy. In the present embodiment, as described above, the liquid discharge heads 50A are provided over the entire region in the width direction of the recording medium M, and the page of the recording medium M printed in the second printing process is different from the page of the recording medium M printed in the first printing process. As described above, in the line type liquid discharge apparatus 100A, the potential of the resistor 80 can be detected by using a period between pages in the multi-page printing as the non-printing process. As a result, it is possible to enjoy the effect of the present disclosure.

D: Modification Example

Each embodiment in the above illustration can be variously modified. Specific modification aspects that can be applied to each of the above-described embodiments are exemplified below. The aspects selected in any manner from the following examples can be appropriately combined with each other within a range of not being inconsistent with each other.

D1: Modification Example 1

The liquid discharge apparatus 100 exemplified in the above-described embodiment may be adopted in various devices such as a facsimile machine and a copier, in addition to a device dedicated to printing, and the application of the present disclosure is not particularly limited. Note that the application of the liquid discharge apparatus is not limited to printing. For example, a liquid discharge apparatus that discharges a solution of a coloring material is used as a manufacturing apparatus that forms a color filter of a display apparatus such as a liquid crystal display panel. In addition, a liquid discharge apparatus that ejects a solution of a conductive material is used as a manufacturing apparatus that forms a wire or an electrode on a wiring substrate. In addition, a liquid discharge apparatus that ejects a solution of an organic substance related to a living body is used, for example, as a manufacturing apparatus that manufactures a biochip.

What is claimed is:

1. A drive method of a liquid discharge apparatus including a liquid discharge head that includes a nozzle, a pressure chamber communicating with the nozzle, a piezoelectric element that is configured to apply a pressure to a liquid in the pressure chamber, a drive line coupled to the piezoelectric element, and a resistor for measuring a temperature of the liquid in the pressure chamber, in which the piezoelectric element has a first electrode, a second electrode, a piezoelectric body disposed between the first electrode and the second electrode, and the resistor is made of the same material as any of the first electrode, the second electrode, and the drive line, the method comprising:

executing a non-printing process of preventing a liquid from being discharged toward a recording medium after executing a first printing process of printing a first image on the recording medium by a liquid discharged from the nozzle and before executing a second printing process of printing a second image on the recording medium by a liquid discharged from the nozzle; and detecting a potential of the resistor when a state of a potential applied to the drive line is in a state of causing no liquid to be discharged from the nozzle during an execution period of the non-printing process, wherein a support section that supports the recording medium facing the nozzle is heated to a set temperature by a heater, and the set temperature in the second printing process is corrected based on a result of detecting the potential of the resistor in the non-printing process.

2. The drive method of a liquid discharge apparatus according to claim 1, wherein the resistor has a portion that is in contact with the piezoelectric body.

3. The drive method of a liquid discharge apparatus according to claim 1, wherein no potential is applied to the drive line over a period during which the potential of the resistor is detected.

4. The drive method of a liquid discharge apparatus according to claim 1, wherein a constant potential is applied to the drive line over a period during which the potential of the resistor is detected.

5. The drive method of a liquid discharge apparatus according to claim 1, wherein the drive line is applied with a potential that changes not to discharge the liquid from the nozzle, over a period during which the potential of the resistor is detected.

6. The drive method of a liquid discharge apparatus according to claim 1, wherein during the execution period of the non-printing process, the drive line is applied with a potential that changes to stir a liquid in the nozzle without discharging the liquid from the nozzle, over a period different from a period during which the potential of the resistor is detected.

7. The drive method of a liquid discharge apparatus according to claim 1, wherein during an execution period of the first printing process, the liquid discharge head moves in a first direction, during an execution period of the second printing process, the liquid discharge head moves in a second direction opposite to the first direction, and during the execution period of the non-printing process, the recording medium moves in a third direction intersecting the first direction.

8. The drive method of a liquid discharge apparatus according to claim 1, wherein the liquid discharge head is provided over an entire region in a width direction of the recording medium, and a page of the recording medium printed in the second printing process is different from a page of the recording medium printed in the first printing process.

9. The drive method of a liquid discharge apparatus according to claim 1, wherein a drive signal to be supplied to the piezoelectric element in the second printing process is corrected based on a result of detecting the potential of the resistor in the non-printing process.

* * * * *